March 1, 1966  J. M. MINCY  3,237,872
LUBRICANT AND COOLANT APPLICATOR
Filed April 2, 1965
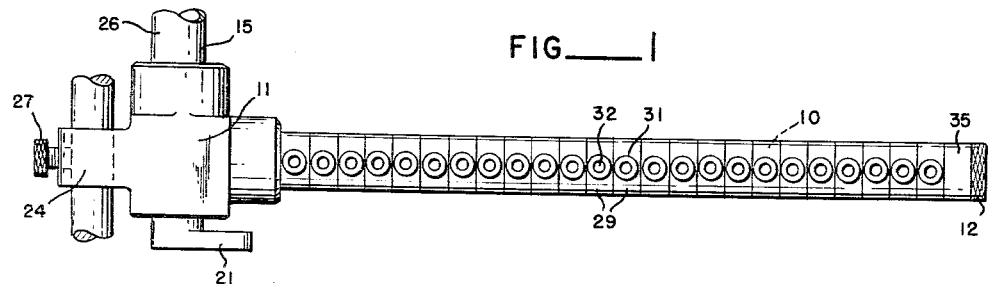
FIG.—1
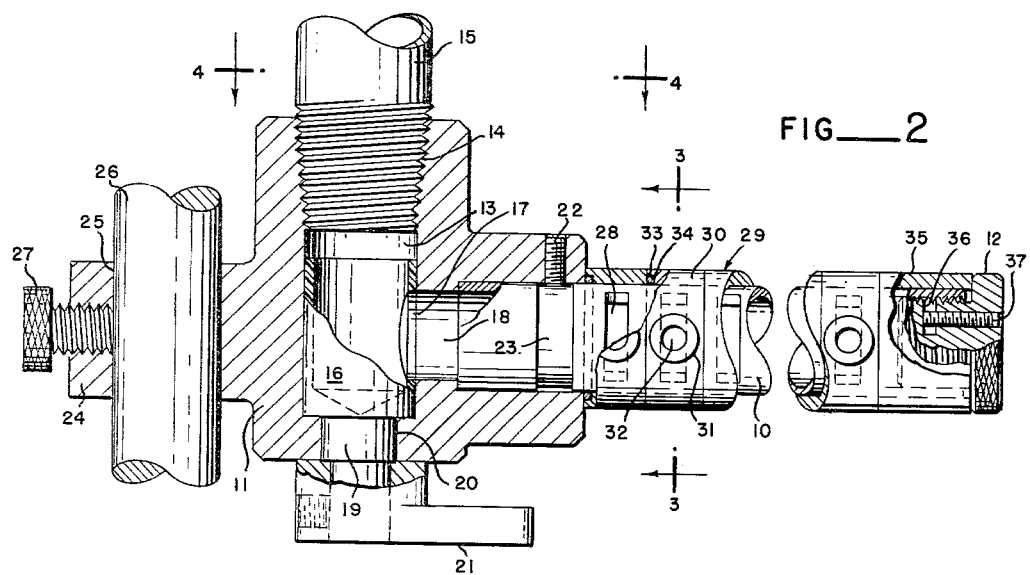
FIG.—2
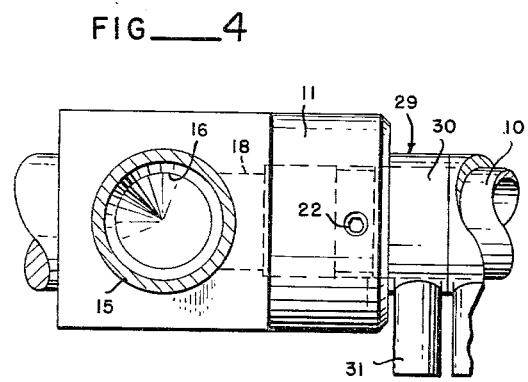
FIG.—4
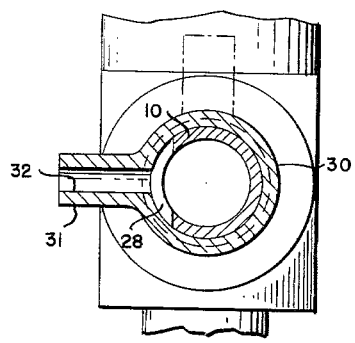
FIG.—3
JAMES M. MINCY
*INVENTOR.*
BY *Seed & Berry*
ATTORNEYS United States Patent Office 3,237,872
Patented Mar. 1, 1966

3,237,872
LUBRICANT AND COOLANT APPLICATOR
James M. Mincy, 4020 76th SE.,
Mercer Island, Wash.
Filed Apr. 2, 1965, Ser. No. 446,142
5 Claims. (Cl. 239—562)

The present application is a continuation-in-part of my copending United States application Serial Number 259,-255, filed February 8, 1963, now abandoned.

This invention relates to a lubricant and coolant applicator designed particularly for use in connection with milling machines and the like for discharging and directing a stream or a plurality of streams of a fluid lubricant and coolant to the milling cutters and pieces being worked on. More particularly it relates to an applicator whereby a liquid lubricant and coolant may be delivered in use from a common source through a tube or discharge selectively and simultaneously through one or more of a plurality of nozzles or spouts associated with the tube.

It is recognized that adequate and proper lubrication of milling cutters is essential in milling practice because it has a considerable effect on surface finish, cutter consumption and in easing the task of cutter teeth. Stream lubrication is used in the operation of most present-day milling machines; the lubricant being pumped under controlled pressure through flexible tubing to the work and the run-off lubricant may be returned to the base of the pump for reuse. The advantages of the use of a lubricant with a coolant also is well recognized in the industry.

It is the principal object of this invention to provide a lubricant and coolant applicator that comprises a somewhat elongated delivery tube that is so associated with a milling machine as to receive and discharge a liquid lubricant and a coolant to the cutters; the tube being formed at spaced intervals therealong with lubricant discharge outlets and with lubricant discharge spouts or nozzles corresponding thereto; the latter being selectively adjustable on the tube for the discharge of the fluid lubricant and coolant to best accommodate the work being done.

It is a further object of the present invention to provide a lubricant applicator as above stated, in which the delivery tube serves to supply the lubricant equally to all nozzles, and wherein each nozzle is rotatably adjustable axially on the tube between its open and closed positions.

It is an object of this invention to provide the lubricant delivery tube with an adjustable connection to a mounting member at one end that may be shifted to different positions up or down along a supporting rod or bracket to best suit the position of the applicator to the work at hand, and which mounting member is fitted with a rotatably adjustable shut-off valve for control of the flow of lubricant to the nozzle mounting tube.

Another object of this invention is to provide a lubricant and coolant applicator having an elongated delivery tube with selectively adjustable discharge nozzles having specially adapted sealing means between individual nozzles and the supply pipe.

Further objects and advantages of the present invention reside in the details of construction and combination of the various parts of the device as will hereinafter be described and in its mode of use.

In accomplishing the above mentioned and other objects of the invention, I have provided the improved details of construction, the present preferred forms of which are illustrated in the accompanying drawings, wherein:

FIG. 1 is a side view of the present applicator as mounted horizontally for use.

FIG. 2 is an enlarged sectional view of the mounting member of the applicator, showing the receiving end portion of the lubricant delivery tube as applied thereto.

FIG. 3 is an enlarged cross-sectional view taken on line 3—3 of FIG. 2 showing one of the discharge spouts or nozzles as applied thereto.

FIG. 4 is a partially sectional top plan view taken along lines 4—4 of FIG. 2.

Referring more in detail to the drawings, the present applicator is here shown as being horizontally disposed. However, it is to be understood that its position of use would be established in accordance with the particular requirements and nature of the machine with which it is used.

The device comprises a lubricant delivery tube 10 that is mounted at what will be designated its inner end, in a valve housing 11 and at its outer end is closed by a plug 12 that is threaded thereinto.

The valve housing 11 is formed with a cylindrical valve chamber 13 which opens upwardly into a continuing internally threaded bore 14 to which a lubricant supply pipe line 15 is applied. A valve 16 is rotatably fitted in the chamber 13 to control the flow of lubricant from pipe 15 to tube 10. It is of cylindrical, tubular form, open at its upper end, closed at its lower end, as in FIG. 2, and provided with side wall port 17 that may be adjusted, by rotation of the valve, into and from registration with a lateral outlet 18 from the chamber that is in direct communication with the open inner end of tube 10. The valve 15 has a stem 19 extending coaxially from its lower end and passing through a housing opening 20. This stem is equipped with a turning lever 21 suitable for ready manual adjustment of the valve 15 between open and closed positions. The inner end of pipe 10 is rotatably fitted in a counter bored outer end portion of outlet 18 and can be held at any position of axial rotation by means of the set screw 22. As seen in FIG. 2, the set screw 22 is threaded into the valve housing and engages the annular channel or groove 23 in pipe 10 for holding the pipe in a fixed position. Thus the entire pipe, along with the nozzles, may be rotated axially to relocate the nozzles at any given position.

Extending from the housing 11, directly opposite the position of the discharge tube 10, is a boss 24 that is formed with a vertical bore 25 therethrough that receives a vertical supporting rod 26 of a supporting bracket providing that the applicator may be adjusted vertically to different working levels, and also swing radially on the rod to different angular positions. A set screw 27 is threaded into the boss 24, as in FIG. 2, for tightening against the rod to secure the adjustment.

The tube 10 is formed longitudinally at regular intervals of spacing therealong with a row of circumferentially directed arcuate slots 28 as shown in FIGS. 2 and 3. Fitted for rotation on the tube 10, in close fitting relationship therealong, as in FIG. 1, are the individual lubricant nozzle units 29. Each of these is axially rotatably adjustable on the tube independently of the others, and, as seen in FIG. 3, each has a hub portion 30 from which a radially directed nozzle or spout 31 extends. All the nozzles may be of the same dimensions and each has a discharge passage 32 leading outwardly from its hub to the outer end of the corresponding nozzle. At their inner ends each passage may, by rotary adjustment of the hub about the tube 10, be moved into and from registration with the corresponding arcuate slot 28. These hubs provide for swinging adjustment of the nozzles through arcs of about 90 degrees while open for discharge.

Each of the nozzle units is provided with an annular sealing ring 33 located in a suitable counter bored portion 34 of the hub 30. The sealing rings 33 may be made of any desired cross section with the preferred form shown being that of a conventional O-ring seal of rubber or other deformable material. As seen most clearly in FIG. 2, the sealing rings 33 are located so as to provide a movable sealing face between the individual nozzle units as well as between the nozzle units and the pipe 10. A cylindrical spacer 35 may be provided between the plug 12 and the end nozzle to allow the nozzle units to be slightly pressured against each other by means of the screw plug. Enough pressure will be applied in order to obtain a good seal between the units by deforming the rings 33 and yet allow the nozzles to be freely rotated. In order to insure that the plug 12 is not loosened by turning of the nozzles, the plug is transversely slotted as at 36 to provide a weakened area and the plug is tapped longitudinally to receive a set screw 37. When the plug has been properly positioned, the set screw 37 is tightened to lock the plug in place by slightly spreading the body thereof in the area of the slot 36.

Assuming that the applicator is constructed as above described and is suitably mounted for use with a milling machine, or the like, its use would be substantially as follows:

The device is first adjusted to the desired elevation on the vertical supporting rod 26 and the tube 10 is then swung radially about the rod to a desired angular direction, depending on the work at hand. Then the directional and elevational adjustment is secured by tightening set screw 27. The nozzles would ordinarily at that time all be set in their closed positions, as shown in dash lines in FIG. 3. The tube may then be set in the desired rotational position by tightening the set screw 22 in the groove 23.

With the proper positioning of the applicator tube, the valve 16 is opened to admit lubricant from the supply line 15, through the valve to tube 10, then the discharge lubricant from the tube through the desired nozzle or any selected group of nozzles may be effected merely by swinging the selected nozzles to their open positions. To stop flow of lubricant from any nozzle, it is merely swung back to its closed position so that the associated slot 28 is blocked off. With the proper pressure applied by the plugs 12 the nozzles are sealed and no leakage will occur.

This device provides for the selective use of any single nozzle or for their use in multiples, as required for any particular operation. Use of the applicator is the same for vertical, angular or horizontal setting.

In the following claims, the liquid comprised by the lubricant and coolant will be referred to as "the lubricant."

Having thus described the invention, I claim as new therein:

1. An applicator for a liquid lubricant or the like comprising: a valve housing including a lubricant inlet passage and a discharge passage, valve means in said housing for controlling the flow of lubricant, a discharge pipe mounted in said housing and extending outwardly from said discharge passage, said discharge pipe being provided at spaced intervals therealong with circumferentially directed discharge slots, a plurality of adjacent nozzle units rotatably mounted on said pipe, each of said nozzle units being in registration with a discharge slot to control flow and direction of discharge from said nozzle units, and an annular sealing means carried by each nozzle unit to provide a liquid seal between adjacent nozzles.

2. The combination according to claim 1 wherein; said slots are provided in the pipe are in spaced alignment therealong and are substantially equal in length to accommodate the rotary adjustment of the discharge nozzle units about the pipe, said pipe being rotatably adjustable in the valve housing to establish the direction of discharge from the bank of nozzles to any selected radial direction.

3. The combination according to claim 1 wherein each nozzle unit comprises a cylindrical hub fitted to and for its rotation about the pipe, and a discharge nozzle extending radially from the hub with its discharge passage opening into the hub for registration with or movement out of registration with the corresponding discharge slot of said pipe by rotative adjustment of said hub on the pipe.

4. The combination according to claim 3 wherein said sealing means comprises a deformable O-ring carried by the hub of each nozzle unit and having a sealing face against said pipe and the adjacent nozzle unit.

5. The combination according to claim 4 wherein said pipe is provided with a screw plug at the end opposite said valve housing, said screw plug providing means to press said nozzle units together, and means to lock said plug in any given position.

References Cited by the Examiner

UNITED STATES PATENTS

| | | | |
|---|---|---|---|
| 596,941 | 1/1898 | Millspaugh | 239—551 |
| 648,414 | 5/1900 | Kenison | 239—164 |
| 1,035,441 | 8/1912 | Honabach et al. | 239—569 |
| 1,652,599 | 12/1927 | Ayers | 239—562 |
| 1,657,538 | 1/1928 | Koepf | 239—562 |
| 2,299,259 | 10/1942 | Sites | 239—587 |
| 2,580,145 | 12/1951 | White | 239—172 |
| 3,023,970 | 3/1962 | Knoell | 239—176 |

EVERETT W. KIRBY, *Primary Examiner.*